United States Patent
Benes et al.

(10) Patent No.: US 8,055,198 B2
(45) Date of Patent: Nov. 8, 2011

(54) UPLINK INTERFERENCE CONTROL IN A WIMAX COMMUNICATION SYSTEM

(75) Inventors: Stanley J. Benes, Round Lake Beach, IL (US); Chandrasekar Sankaran, Arlington Heights, IL (US); Fan Wang, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 569 days.

(21) Appl. No.: 12/198,910

(22) Filed: Aug. 27, 2008

(65) Prior Publication Data

US 2010/0056057 A1  Mar. 4, 2010

(51) Int. Cl.
*H04B 1/00* (2006.01)
*H04B 15/00* (2006.01)

(52) U.S. Cl. .............. 455/63.1; 455/522; 455/67.11

(58) Field of Classification Search ............... 455/522, 455/63.1, 67.11, 67.13, 69, 561
See application file for complete search history.

(56) References Cited

U.S. PATENT DOCUMENTS

| 2007/0066242 | A1* | 3/2007 | Yi et al. ................ 455/69 |
| 2007/0082619 | A1* | 4/2007 | Zhang et al. .......... 455/69 |
| 2007/0082620 | A1* | 4/2007 | Zhang et al. .......... 455/69 |
| 2008/0198790 | A1* | 8/2008 | Harpak et al. ........ 370/316 |
| 2009/0017859 | A1* | 1/2009 | Seppinen et al. ..... 455/522 |

* cited by examiner

*Primary Examiner* — Ping Hsieh

(57) ABSTRACT

An apparatus and method to provide uplink interference control in a WiMAX communication system includes a step 302 of receiving a downlink channel quality indication from an MS. A next step 304 selecting a modulation product ratio modification parameter in response to the channel quality indication. A next step 306 includes modifying a modulation product ratio by the modification parameter. A next step 308 includes mapping the modified modulation product ratio against a table of modulation coding schemes. A next step 312 includes applying the mapped modulation coding scheme.

12 Claims, 4 Drawing Sheets

UPLINK INTERFERENCE CONTROL IN A WIMAX COMMUNICATION SYSTEM

FIELD OF THE INVENTION

This invention relates to WiMAX wireless communication systems, and in particular, to a mechanism for controlling uplink interference in a WiMAX communication system.

BACKGROUND OF THE INVENTION

WiMAX (Worldwide Interoperability for Microwave Access) is a recently introduced broadband wireless access technology, standardized in IEEE 802.16e. One problem occurring in existing WiMAX systems is the level of interference being experienced, particularly in relation to uplink (UL) interference from mobile stations of adjacent cells. Specifically, WiMAX UL system performance is limited by adjacent interference power from these mobile stations.

In order to guarantee the system performance for users on a cell edge, it is important to limit the UL Interference over Thermal (IoT) criterion from adjacent cells, as is known in the art. For example, in Long Term Evolution (LTE) broadband wireless communication systems, it is known to pass an L2 message describing measured adjacent cell IoT between cells. This message can then be used in UL power control, such as fractional power control. The result of the UL power control is tightly controlled IoT level at a base station. However, in WiMAX systems this type of L2 messaging does not exist. As a result, each base station has no knowledge of interference being experienced on neighboring cells. Although the current WiMAX system includes a scheduler and resource allocation that can efficiently schedule users and allocate resources, the UL interference IoT is not tightly controlled.

In addition, there have been some reports that up to 85% of WiMAX mobile stations transmit at full power. Not only does this contribute to interference problems, this directly equates to reduced battery life in mobile stations, which is also of interest to WiMAX customers.

What is needed is a technique to control IoT by reducing the power that a mobile station requires to achieve reliable WiMAX communications, which also serves to extend battery life in the mobile station. It would also be of benefit to provide this IoT control without the knowledge of adjacent cell IoT information.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a technique to control IoT by reducing the power that a mobile station requires to achieve reliable WiMAX communications, while also extending battery life in the mobile station. The present invention also provides this IoT control without the knowledge of adjacent cell IoT information.

Specifically, the present invention introduces a new scheduling criterion for uplink users, wherein a scheduler of a base station minimizes IoT without need for addition interference condition feedback from base stations or mobile stations. The criterion added to the scheduler takes into account the interference impact on at least the two closest base stations to the mobile, whereupon the serving base station will adjust the served mobile stations Modulation Coding Scheme (MCS) to minimize interference impact. In particular, an increase in modulation coding equates to more data per frame, which equates to less slots per user, which correlates with increased interference.

Figure 1:
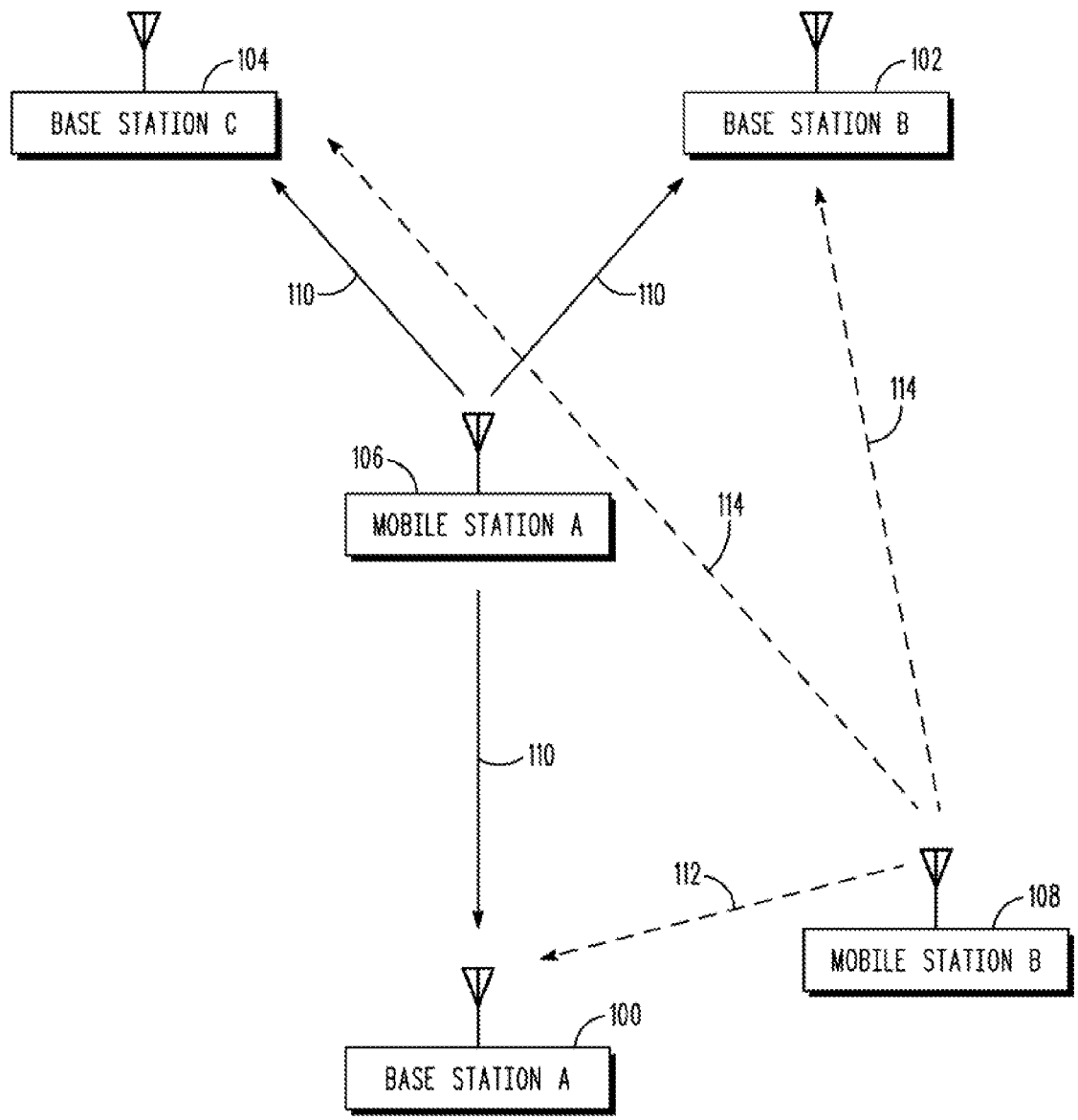
FIG. 1 shows a block diagram of a system, in accordance with the present invention.

FIG. 1 shows a block diagram of an uplink configuration of a WiMAX communication system, in accordance with the present invention. The communication system can include a plurality of cells (three represented) each having a base station (BS) 100, 102, 104 in communication with one or more subscriber station or mobile station (MS) 106, 108. In the preferred embodiment of the present invention, communication system 100 utilizes an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In addition, in alternate embodiments the communication system 100 may utilize other cellular communication system protocols such as, but not limited to, TDMA, direct sequence CDMA (DS-CDMA), and the like.

Mobile Station A 106 is located close to the cell edge of three different cells and has approximately equal connection strengths 110 with the three associated base stations A, B, C, even though Base Station A 100 is the serving base station for MS A 106, whereas Mobile Station B is strongly connected 112 to BS A 100, and weakly visible 114 to two other base stations, BS B 102 and BS C 104. MS A 106 will provide just as much interference to the neighbor cells (B and C) as it will provide signal to its serving cell (A). MS B 108 provides a much stronger signal 112 to its serving cell A than the neighboring cells, B and C.

Without interference control, each MS will try to use the highest MCS in order to maximize the spectral efficiency. The result of this competition results in a high IoT at neighboring base stations, and each MS typically tends to transmit with full power (i.e. its highest MCS) more often. In WiMAX, there is no kind of signaling between base stations to indicate interference. However, the present invention proposes to use the UL/DL reciprocity conditions, (i.e. the UL and DL experience essentially the same channel conditions in a particular time period), of the Time Division Duplex (TDD) WiMAX system to provide UL power control through MS Channel Quality Indicator (CQI) feedback. It should be noted that the "power control" as defined herein is indeed interference control, and is different from the "power control" as defined in the IEEE 802.16 standard. In the IEEE 802.16 standard, the purpose of power control is to achieve a required SINR at base station given a path loss and base station interference level.

In the existing implementation of the WiMAX IEEE 802.16e standard, an MS calculates the transmitted power per the Carrier-to-Interference-plus-Noise Ratio (CINR) required by the MCS instructed to be used by the BS. The BS may then choose the highest MCS as allowed by MS's maximum transmit power, which results in high interference at a neighboring BS and reduced coverage for cell-edge users. In contrast, the present invention lowers the MCS to reduce interference, which actually benefits all MSs and particularly cell-edge users.

Figure 2:
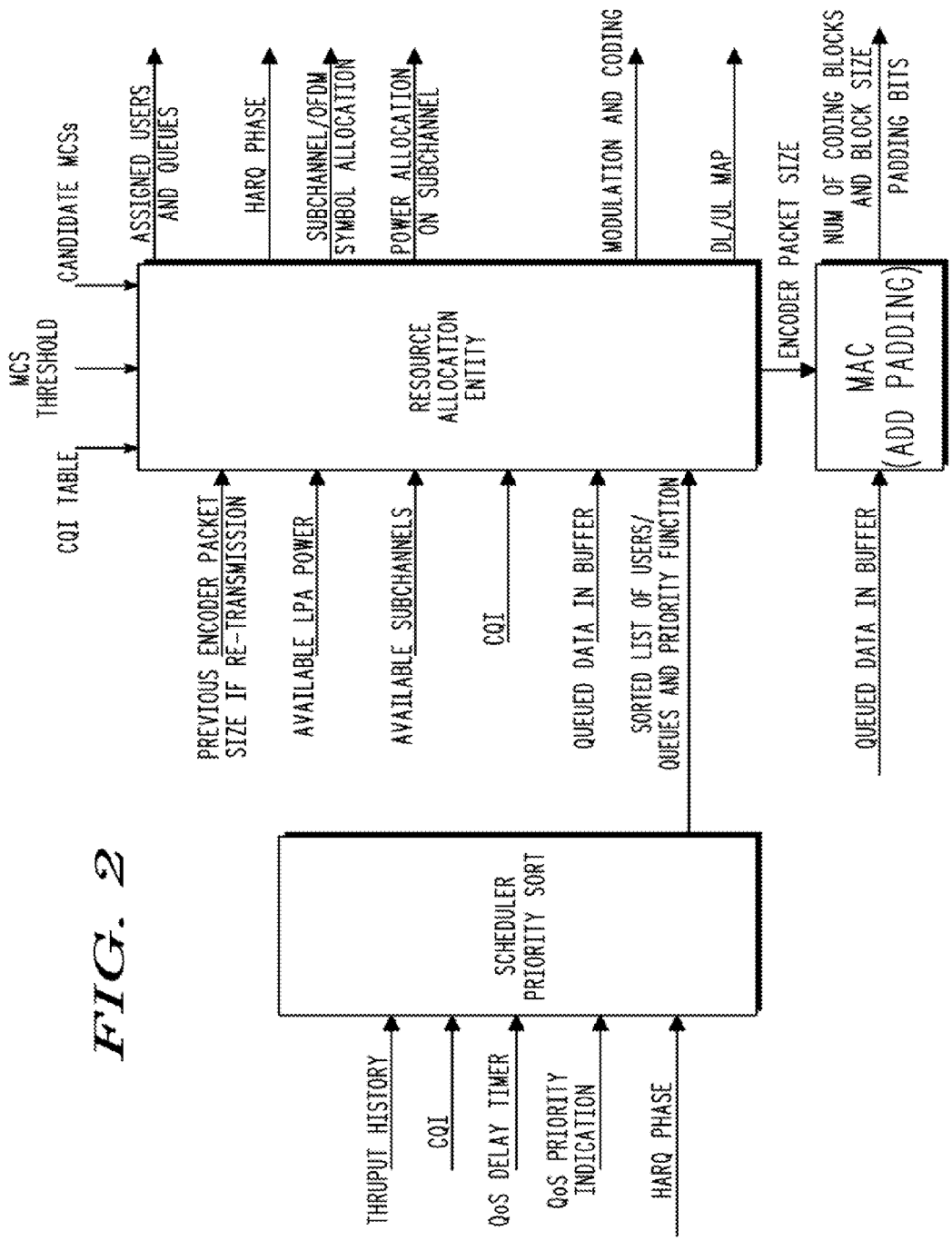
FIG. 2 shows an illustration of a scheduler/resource allocator of a base station, in accordance with the present invention.

Referring to FIG. 2, the present invention introduces a heuristic formula to be used by a scheduler and resource allocator in a base station to determine the highest UL MCS to be used by a particular MS. Specifically, the scheduler will receive CQI feedback about downlink channel conditions from an MS. CQI equates to CINR. If an MS reports good channel conditions, it is assumed that the MS is not located on a cell edge and is not necessarily a candidate for power control. However, if an MS reports poor channel conditions, it is assumed that the MS is located close to a cell edge and may therefore be causing interference on neighboring cells, and is therefore a candidate for power control. As used herein power control is achieve by adjusting an MCS used by this cell edge MS, wherein lower modulation coding results in a lower spectral power density and therefore less interference.

With the CQI received from an MS as the Carrier-to-Interference-plus-Noise Ratio (CINR), the highest UL MCS for this MS is then limited by the scheduler using $$MPR_{max}^i = A \cdot \log_2(1 + B \cdot D_{info} \cdot SINR^i) \quad \text{Eq. (1)}$$

Where MPR is the maximum modulation product ratio for the $i^{th}$ MS, $SINR^i$ is Signal-to-Interference-plus-Noise Ratio for the $i^{th}$ MS, and A and B are scheduler parameters which are known in the current UL scheduler/resource allocation (i.e., used in current scheduler), and where $D_{info}$ is introduced by the present invention and is empirically determined for specific system configurations.

In addition, the modulation product ratio can be modified as $$MPR^i = \min(MPR_0^i, MPR_{max}^i)$$

where $MPR_0^i$ is the modulation product ratio determined by an uplink scheduler based on uplink interference and mobile transmit power, and $MPR_{max}^i$ is the uplink modulation product ratio modification parameter corresponding to highest modulation product ratio for the $i^{th}$ mobile station in response to its downlink channel quality indication.

In practice, if CINR from an MS is poor then $D_{info}$ is set low, and vice versa. For example, a $D_{info}$ value of 2.0 or 3.0 is recommended for Frequency Reuse Scheme (FRS) 1×3×1 systems and FRS 1×4×2 systems. Although $D_{info}$ can be preset per the FRS configuration, as described above, $D_{info}$ could also be dynamically determined for each BS and/or MS. For example, a table could be set up that maps a given particular CINR (i.e. CQI) to a $D_{info}$ to be used in Eq. 1. When MPR is determined, it is mapped to an existing table of MCSs in order to define the highest UL MCS to be used by the MS, which is particularly applicable if the MS is operating close to a cell edge.

The above interference mitigation algorithm is implemented in each BS 100, 102, 104 as a part of the base station scheduler of FIG. 2. In this way, the BS scheduler determines the highest UL MCS based on the CQI feedback that was originally intended for DL MCS determination.

In the present WiMAX standard the UL scheduler/resource allocation algorithm defines a per cluster capacity as $$I_{cluster}(0) = A \cdot N_{cluster} \cdot \log_2(1 + B \cdot \tau_0 \cdot p_i) \quad \text{Eq. (2)}$$

Where $I_{cluster}$ is the information carried by the cluster, $N_{cluster}$ is number of subcarriers included in the cluster, $p_i$ is the transmit power per data tone, and $\tau_0$ is normalized data tone CQI, as is known in the art. In a specific implementation of the present invention, this equation is modified using Eq. 1 as $$I_{cluster}(0) = \max(A \cdot N_{cluster} \cdot \log_2(1 + B \cdot \tau_0 \cdot p_i), N_{cluster} \cdot MPR_{max}^i) \quad \text{Eq. (3)}$$

In addition, a WiMAX scheduler provides a conditional substep as if $k>7$ (assuming 7 total MCS levels), then exit the sub-loop  Eq. (4)

whereas the present invention modifies the sub-step conditional to if $k$>total # of MCS levels or $MPR[k]>MPR_{max}^i$, then exit the $I_{cluster}$ sub-loop  Eq. (5)

where MPR[k] is defined as the MPR level (from 1 to 7 (i.e. the total number of MCS levels)) related to the $k^{th}$ entry of the 7 (i.e. the total number of MCS levels) entry array. It should be noted that the present invention can make similar modifications for the UL Spatial Diversity Multiple Access (SDMA) scheduler algorithm.

Figure 3:
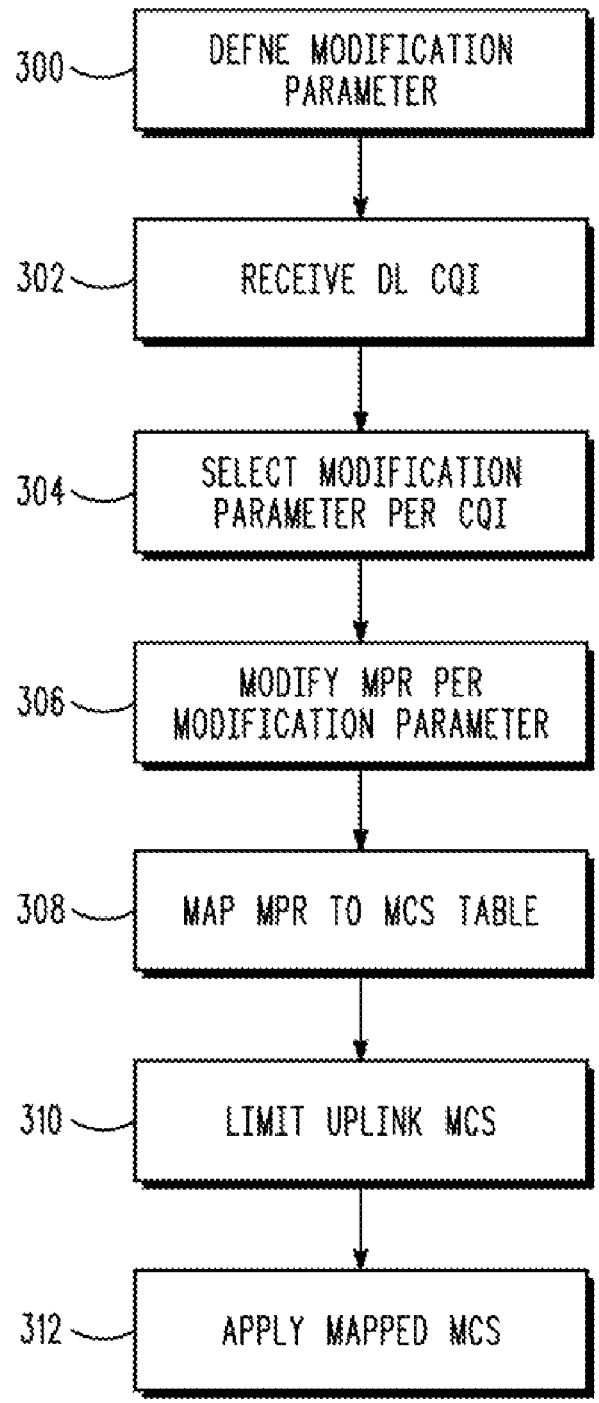
FIG. 3 shows a flow chart illustrating a method, in accordance with the present invention.

FIG. 3 shows a flowchart that illustrates a method to provide uplink interference control in a WiMAX communication system, in accordance with the present invention.

A first step 300 includes defining at least one modulation product ratio modification parameter, and preferable a table of modification parameters.

A next step 302 includes receiving a downlink channel quality indication from an MS by a BS.

A next step 304 includes selecting an uplink modulation product ratio modification parameter in response to the downlink channel quality indication by the BS scheduler. This step can be performed dynamically upon the receiving step receiving a CQI, or all of these steps can be performed once per FRS, wherein a different modification parameter is selected for different frequency reuse schemes.

A next step 306 includes modifying an uplink modulation product ratio by the uplink modulation product ratio modification parameter determined by the downlink channel quality indication by the scheduler, per Eq. 1, wherein the modification parameter $D_{info}$ is determined from the defining and selecting steps. In addition, this step can include the modifying step modifying the modulation product ratio as $$MPR^i = \min(MPR_0^i, MPR_{max}^i)$$

where $MPR_0^i$ is the modulation product ratio determined by an uplink scheduler based on uplink interference and mobile transmit power, and $MPR_{max}^i$ is the uplink modulation product ratio modification parameter corresponding to highest modulation product ratio for the $i^{th}$ mobile station in response to its downlink channel quality indication.

A next step 308 includes mapping the uplink modified modulation product ratio against a table of modulation coding schemes by the scheduler.

A next step 310 includes limiting an uplink modulation coding scheme level to be equal or less than a downlink modulation coding scheme level.

A next step 312 includes the BS instructing the MS to apply the mapped uplink modulation coding scheme as a maximum modulation coding scheme.

Figure 4:
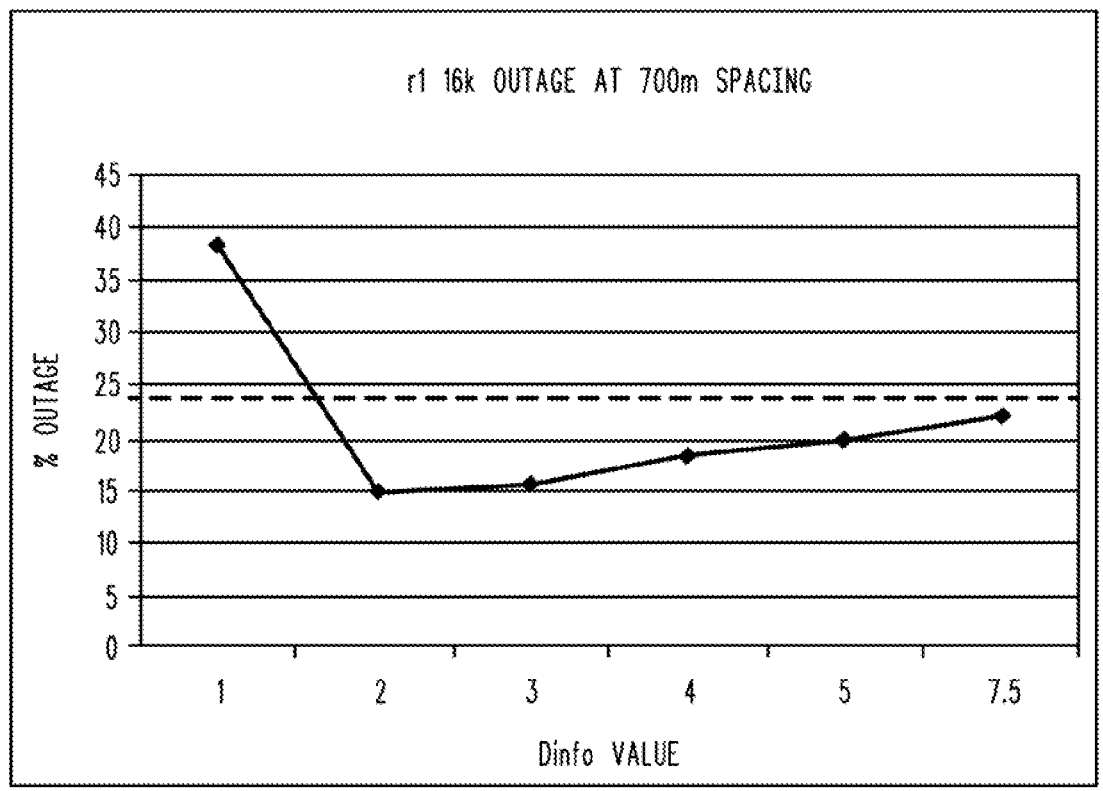
FIG. 4 shows a graphical representation of a simulation, in accordance with the present invention.

Referring to FIG. 4, simulation results for various values of $D_{info}$ in Eq. 1 have shown that the present invention can provide up to a 25 dB reduction in IoT, a ten point reduction in 16 k outage, and an increase in sector throughput of 5% when using the new interference mitigation technique of the present invention, such as in 1×3×1 systems example as shown. The improvement in outage is also reduced in 1×4×2 frequency reuse systems, while sector throughput is improved by 6%. With UL VoIP traffic, the present invention provides a delay performance improvement for 85% to 95% of users with <50 ms delay. This delay performance improvement maps to an increase in capacity.

Advantageously, the present invention enables the control IoT by reducing the transmit power that a mobile station requires to achieve reliable WiMAX communications, without the knowledge of adjacent cell IoT information, while also extending battery life in mobile stations. In particular, the present invention schedules a lower MCS to reduce interference, which benefits all MSs and particularly cell-edge users. The present invention can be used in conjunction with many other of the proposed interference and/or extended mobile battery life techniques. The concept can be readily used in both Diversity Access Point (DAP) and Smart Antenna Access Point (SAAP) WiMAX communication systems.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method to provide uplink interference control in a communication system, the method comprising the steps of:
    defining at least one modulation product ratio modification parameter;
    receiving a downlink channel quality indication from a mobile station;
    selecting an uplink modulation product ratio modification parameter in response to the downlink channel quality indication;
    modifying an uplink modulation product ratio by the modulation product ratio modification parameter determined by the downlink channel quality indication;
    mapping the uplink modified modulation product ratio against a table of modulation coding schemes;
    limiting an uplink modulation coding scheme level to be equal or less than a downlink modulation coding scheme level; and
    instructing the mobile station to apply the mapped uplink modulation coding scheme;
    wherein the selecting step includes selecting an uplink modulation product ratio modification parameter $MPR_{max}^i$ in response to the downlink channel quality indication:

$$MPR_{max}^i = A \cdot \log_2(1 + B \cdot D_{info} \cdot SINR^i)$$

where $MPR_{max}^i$ is the highest modulation product ratio for the $i^{th}$ mobile station that can allocated by the uplink scheduler, $SINR^i$ is Signal-to-Interference-plus-Noise Ratio for the $i^{th}$ mobile station, and A and B are scheduler parameters, and where the modification parameter $D_{info}$ is the modification parameter determined from the defining and selecting steps.

2. The method of claim 1 wherein the selecting step occurs dynamically upon the receiving step receiving a channel quality indication.

3. The method of claim 1 wherein the steps are performed once per frequency reuse scheme.

4. The method of claim 1 wherein the modifying step includes modifying the modulation product ratio as:

$$MPR^i = \min(MPR_0^i, MPR_{max}^i)$$

where $MPR_0^i$ is the modulation product ratio determined by an uplink scheduler based on uplink interference and mobile transmit power and $MPR_{max}^i$ is the uplink modulation product ratio modification parameter corresponding to highest modulation product ratio for the $i^{th}$ mobile station in response to its downlink channel quality indication.

5. A method to provide uplink interference control in a WiMAX communication system, the method comprising the steps of:

defining at least one modulation product ratio modification parameter;

receiving a downlink channel quality indication from a mobile station by a scheduler of a base station;

selecting an uplink modulation product ratio modification parameter in response to the downlink channel quality indication by the scheduler;

modifying an uplink modulation product ratio by the uplink modulation product ratio modification parameter determined by the downlink channel quality indication by the scheduler;

mapping the uplink modified modulation product ratio against a table of modulation coding schemes by the scheduler;

limiting an uplink modulation coding scheme level to be equal or less than a downlink modulation coding scheme level; and instructing the mobile station to apply the mapped uplink modulation coding scheme as a maximum modulation coding scheme;

wherein the selecting step includes selecting an uplink modulation product ratio modification parameter $MPR_{max}^i$ in response to the downlink channel quality indication:

$$MPR_{max}^i = A \cdot \log_2(1 + B \cdot D_{info} \cdot SINR^i)$$

where $MPR_{max}^i$ is the highest modulation product ratio for the $i^{th}$ mobile station that can allocated by the uplink scheduler, $SINR^i$ is Signal-to-Interference-plus-Noise Ratio for the $i^{th}$ mobile station, and A and B are scheduler parameters, and where the modification parameter $D_{info}$ is the modification parameter determined from the defining and selecting steps.

6. The method of claim 5 wherein the selecting step occurs dynamically upon the receiving step receiving a channel quality indication.

7. The method of claim 5 wherein the steps are performed once per frequency reuse scheme.

8. The method of claim 5 wherein the modifying step includes modifying the modulation product ratio as:

$$MPR^i = \min(MPR_0^i, MPR_{max}^i)$$

where $MPR_0^i$ is the modulation product ratio determined by an uplink scheduler based on uplink interference and mobile transmit power and $MPR_{max}^i$ is the uplink modulation product ratio modification parameter corresponding to highest modulation product ratio for the $i^{th}$ mobile station in response to its downlink channel quality indication.

9. A base station in a communication system providing uplink interference control, the base station comprising:

a memory for holding a defined modulation product ratio modification parameter;

a receiver receiving a downlink channel quality indication from a mobile station; and a scheduler coupled to the memory and receiver and operable to: select an uplink modulation product ratio modification parameter in response to the downlink channel quality indication; modify an uplink modulation product ratio by the modulation product ratio modification parameter determined by the downlink channel quality indication; map the uplink modified modulation product ratio against a table of modulation coding schemes, and instruct the mobile station to apply the mapped uplink modulation coding scheme;

wherein the scheduler selects an uplink modulation product ratio modification parameter $MPR_{max}^i$ in response to the downlink channel quality indication:

$$MPR_{max}^i = A \cdot \log_2(1 + B \cdot D_{info} \cdot SINR^i)$$

where $MPR_{max}^i$ is the highest modulation product ratio for the $i^{th}$ mobile station that can allocated by the uplink scheduler, $SINR^i$ is Signal-to-Interference-plus-Noise Ratio for the $i^{th}$ mobile station, and A and B are scheduler parameters, and where the modification parameter $D_{info}$ is the modification parameter determined from the defining and selecting steps.

10. The base station of claim 9 wherein the scheduler selects the modification parameter dynamically upon receiving a channel quality indication.

11. The base station of claim 9 wherein the scheduler selects the modification parameter once per frequency reuse scheme.

12. The base station of claim 9 wherein the scheduler modifies the modulation product ratio as:

$$MPR^i = \min(MPR_0^i, MPR_{max}^i)$$

where $MPR_0^i$ is the modulation product ratio determined by an uplink scheduler based on uplink interference and mobile transmit power and $MPR_{max}^i$ is the uplink modulation product ratio modification parameter corresponding to highest modulation product ratio for the $i^{th}$ mobile station in response to its downlink channel quality indication.

* * * * *